July 28, 1953 — E. LAVERDISSE — 2,646,655
FEEDING OF ABRASIVES TO GLASS SURFACING TOOLS
Filed May 14, 1952 — 3 Sheets-Sheet 1

INVENTOR
EDMOND LAVERDISSE
BY Haseltine, Lake & Co.
AGENTS

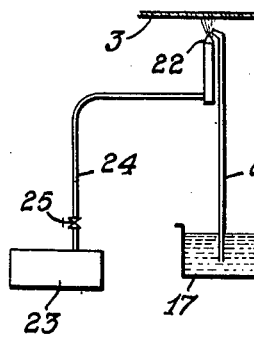
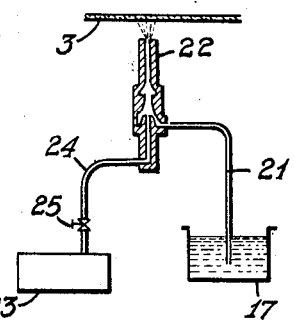
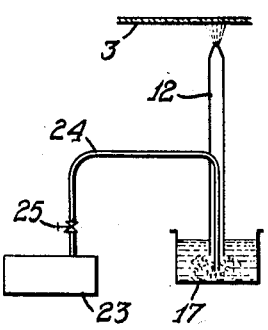
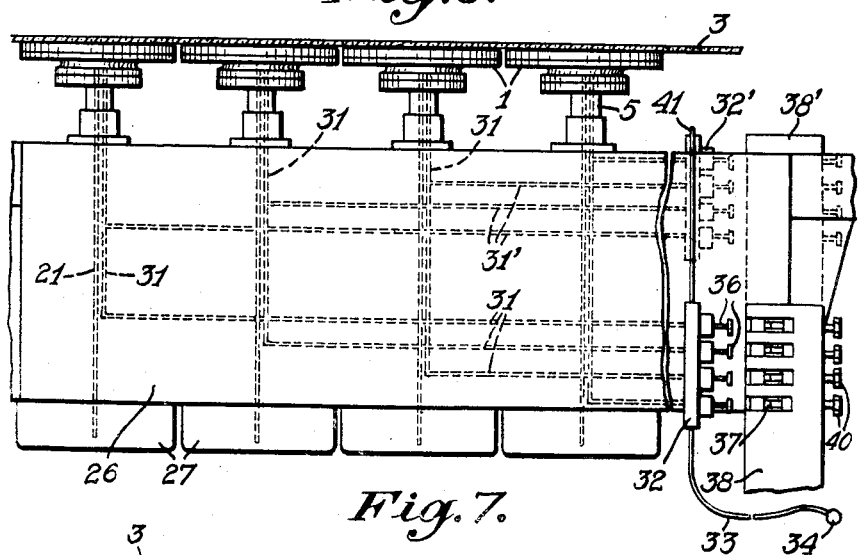
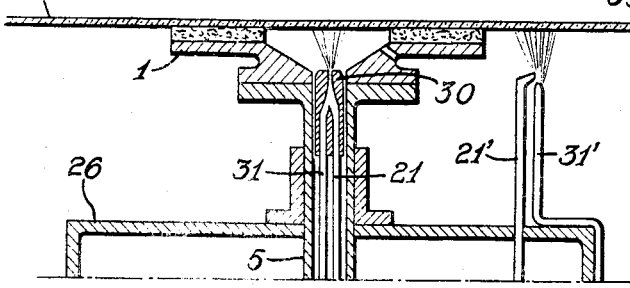

July 28, 1953   E. LAVERDISSE   2,646,655
FEEDING OF ABRASIVES TO GLASS SURFACING TOOLS
Filed May 14, 1952   3 Sheets-Sheet 3
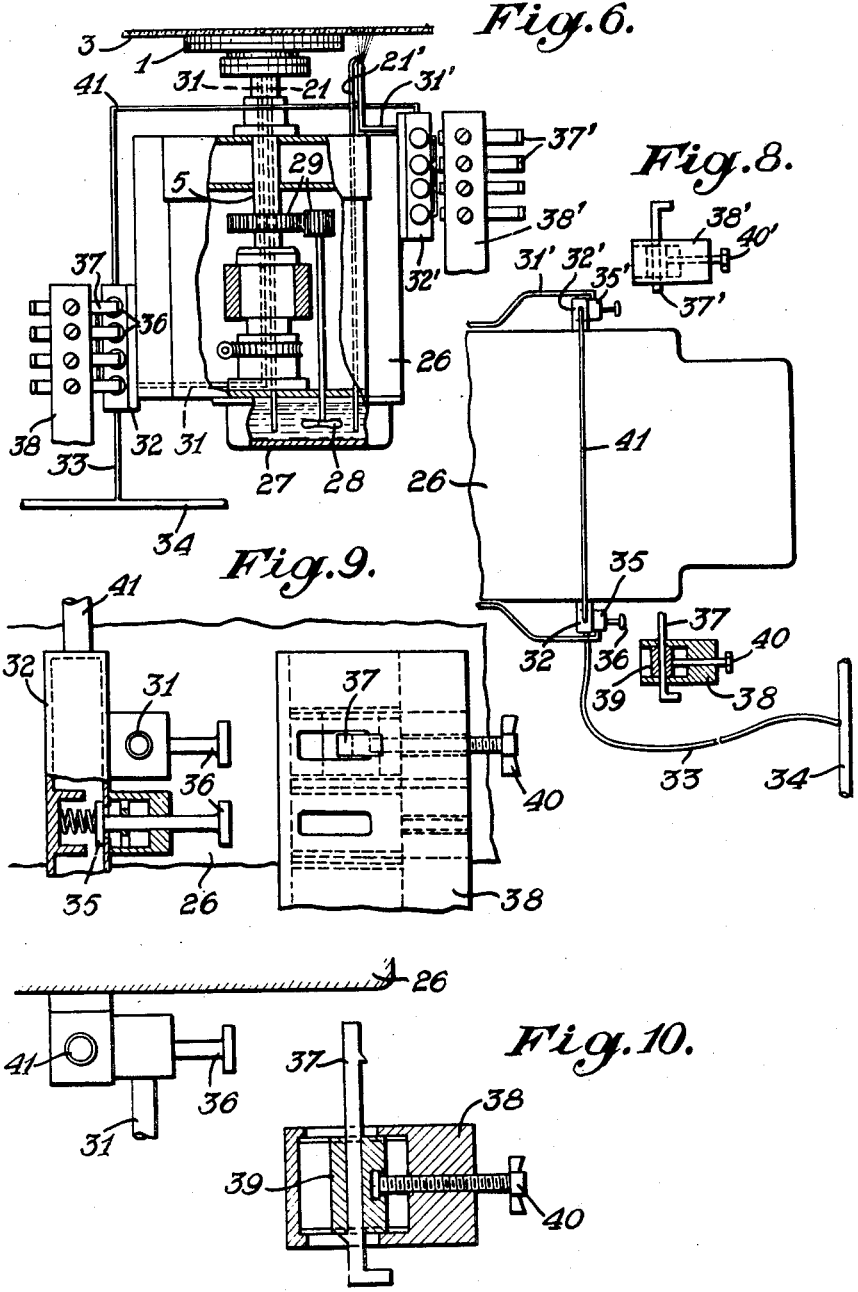
INVENTOR
EDMOND LAVERDISSE
BY Hazeltine, Lake + Co.
AGENTS.

Patented July 28, 1953

2,646,655

UNITED STATES PATENT OFFICE 2,646,655

FEEDING OF ABRASIVES TO GLASS SURFACING TOOLS

Edmond Laverdisse, Auvelais, Belgium, assignor to Les Glaceries de la Sambre, Societe Anonyme, Auvelais, Belgium, a Belgian company Application May 14, 1952, Serial No. 287,684
In Belgium May 19, 1951

10 Claims. (Cl. 51—263)

The present invention relates to the feeding of abrasives to glass surfacing tools, i. e. grinding and/or polishing tools working on one or both faces of a sheet or ribbon of glass, and more particularly to the tools intended to work on the lower face of the glass ribbon.

It is known that grinding tools or irons require to be fed with abrasive, generally consisting of a mixture of sand and water, in order to accomplish their abrasive work. Similarly, the polishing tools must be fed with a mixture of iron oxide (rouge) and water. In both cases, the abrasive mixture is spread over the glass by a relative movement of the glass ribbon and of the tools (forward feed of the ribbon and/or transverse movement of the tools). When the feed of the abrasive mixture is insufficient or irregular, there is a danger of the glass sheet being excessively heated, which may result in breakage thereof.

Now, it is difficult to maintain a regular feed of abrasive to the lower face of the glass, particularly in arrangements for grinding and/or polishing glass simultaneously on both faces, by reason of the tendency of the liquid to drop under the action of gravity. This tendency also arises during the last phase of the polishing, when the polishers are fed only with water, it being practically impossible to regulate the supply of water to the lower face of the glass sheet.

According to the present invention, these disadvantages are obviated by subjecting the mixture of abrasive and water to an atomisation by which it is applied to the glass in the form of very finely divided jets, whereby the effective adhesion thereof to the glass is ensured despite the action of gravity. When the supply of abrasive is interrupted, for example at the end of the polishing, the water feed may be continued by atomisation or it may take place in the form of a jet of vapour or of humidified air.

In the accompanying drawings:

Figures 2, 3 and 4 are diagrammatic views of compressed-air atomisers intended for other embodiments of the invention.

Figure 5 shows in side elevation a part of a beam provided with atomisers according to Figure 2.

Figure 6 is an end view, partly in cross-section, of the beam shown in Figure 5.

Figure 7 is a section on a larger scale corresponding to the upper part of Figure 6.

Figure 8 is a plan view of one end of the beam in Figure 4.

Figures 9 and 10 are elevational and plan views respectively, on a larger scale, of a detail of Figure 8.

Figure 1:
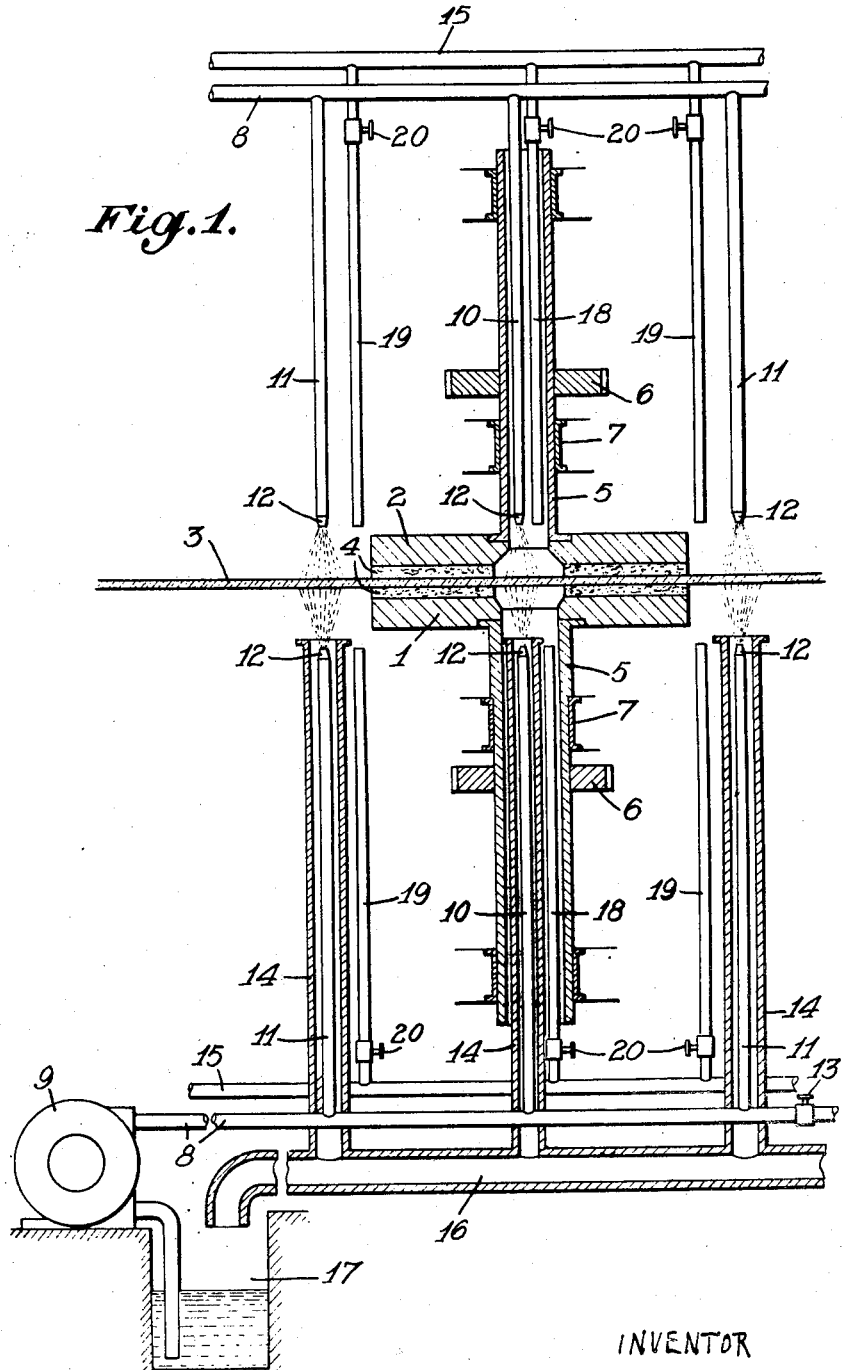
Figure 1 shows diagrammatically by way of example in vertical section an apparatus suitable for carrying the invention into effect.

1 and 2 are the upper and lower tools respectively of a pair of polishers working face to face on a moving ribbon of glass 3 (Figure 1). These polishers, which are lined with felt 4, are each mounted on a sleeve 5 actuated by a toothed wheel 6 and turning in a support or beam 7.

In the example illustrated in Figure 1, abrasive mixture (i. e. rouge and water) is distributed both to the centre of each tool and to the immediate neighbourhood of the periphery thereof. In the case of the lower tools, a duct 8 fed by a pump 9 distributes the mixture of abrasive and water to vertical pipes comprising a central pipe 10 and lateral pipes 11. The said pipes are terminated by atomising nozzles 12 which, when the mixture in the pipes is put under pressure, for example on closing of a valve 13 in the duct 8, deliver on to the lower surface of the glass 3 very fine jets by which the mixture is projected on to this surface in the manner of paint from a spray gun. The mixture is thus applied in the form of a thin layer with an adhesion to the glass which it is not possible to obtain by other means and which prevents any loss of the abrasive mixture.

In order to prevent obstruction of the narrow orifices of the atomisers when the latter are not in use, the operation of the pump is so regulated that, in these cases, the atomisers 12 continue to feed just enough to maintain the circulation in the pipes 10 and 11, the overflow flowing back through the jackets 14 to a return duct 16 which delivers it into the sump 17 from which the pump 9 is fed.

At certain times, notably towards the end of the polishing operation, it is desirable to interrupt the supply of rouge and to feed water only to the polishers. For this purpose there are provided at the side of the pipes 10, 11 in the illustrated examples pipes 18, 19 which are connected to a duct 15 conveying vapour or compressed air of high moisture content. When the valves 20 are opened, the jets delivered by the pipes 18, 19 on to the lower face of the glass cause condensation of the vapour, whereby adhesion of the water to the glass is also ensured in this case and the possibility is afforded of regulating the quantity of water employed with much greater accuracy than by the normal means. If desired, the water may also be applied by atomisation, either by means of the atomisers 12, in which case the tubes 18, 19 are omitted, or by means of the latter tubes, in which case they are provided with atomisers.

The upper tool 2 may be provided, as illustrated, with an arrangement similar to that designated by the reference numerals 8 to 20 in the case of the lower tool 1, with the exception of the return-flow ducts, which are not necessary. Since it is less difficult to effect a uniform, regulated application of the mixture of abrasive and water to the upper face of the glass than to the lower face, the usual feeding means may be employed for the upper tool without any considerable disadvantage.

What has hereinbefore been stated with regard to the polishers is obviously also applicable to the grinding tools, regardless of the form and the arrangement of the tools and of the method by which they are supported.

Figures 2 and 3 show diagrammatically atomisers in which the water charged with abrasive, contained in a sump 17 into which a tube 21 dips, is drawn by the negative pressure set up by the escape, at 22, of compressed air coming from a duct or tank 23 through a pipe 24 provided with a valve 25. A thin jet of water and abrasive is thus projected on to the lower surface of the glass sheet 3. In the example of Figure 4, the compressed air bubbles into the sump 17 and forms with the liquid an emulsion which is projected on to the glass through the nozzle 12.

Figures 5 to 10 show a beam 26 provided with atomisers of the type illustrated in Figure 2, comprising for each tool a tube 21 dipping into a reservoir 27 containing the abrasive mixture maintained in suspension by an agitator 28 actuated, through gears 29, by the hollow shaft 5 of the tool 1. Into the nozzle 30, intended for the central feed of the tool, there are led the tube 21 and a compressed-air pipe 31 coming from a manifold 32 which, in turn, is connected by a flexible pipe 33 to a compressed-air duct 34. The supply of air into each pipe 31 is controlled by a spring-loaded valve 35 (Figure 9) periodically actuated so as to effect the distribution of the abrasive mixture at the required instant.

In the example illustrated in Figures 5 to 10, it is assumed that the beam 26 is actuated with a horizontal reciprocating movement which, at the end of each stroke, causes the end 36 of the stem of the valve 35 to encounter a bracket 37 mounted on a fixed column 38 situated in the vicinity of the beam. The column 38 is preferably provided with a number of brackets 37 corresponding to the number of pipes 31 and tools 1 in order that the admission of compressed air to each of them may be independently regulated. For this purpose, each bracket 37 is mounted in a block 39, the position of which in relation to the column 38 may be regulated by a screw 40, the bracket 37 also being adapted to slide in the block 39 in order that the corresponding valve may be rendered inoperative if necessary.

In the case of a fixed beam, an equivalent operation of the valves may obviously be obtained by controlling the latter by means of a set of rotative cams, or of a mechanism comprising connecting rods and cranks.

The beam illustrated in the drawings comprises for each tool, apart from the central atomiser 30, as hereinbefore described, a lateral atomiser for feeding the mixture to the neighbourhood of the periphery of the tool, the said lateral atomiser drawing the mixture through a tube 21' and conveying it by means of the compressed air fed from a manifold 32' through a pipe 31'. The manifold 32' is provided with valves 35' which can readily be individually controlled similarly to the valves 35 by means of adjustable brackets 37' mounted in a fixed column 38'. A duct 41 connects the manifolds 32, 32' together, the latter thus both being fed from the duct 34 through the flexible pipe 33.

With this construction, it is sufficient to detach the flexible pipe 33 in order that the beam may be removed. It will also be noted that all the regulating members are mounted on fixed frames 38, 38' and are thus always readily accessible.

It is obvious that the reservoirs 27 may be connected to a single reservoir and that other constructional modifications may be applied to the arrangement illustrated without departing from the scope of the invention.

I claim:

1. Process for feeding abrasive fluid to glass surfacing tools working at least on the lower face of a glass sheet, comprising periodically applying a driving force to the abrasive fluid and subjecting said fluid to atomisation, periodically vaporising water, and alternately projecting said atomized fluid and water vapor onto the lower face of the glass sheet.

2. Apparatus for finishing at least the lower face of a glass sheet, comprising a plurality of revolving tools adapted to work on the lower face of a glass sheet, a beam carrying said tools in operative position, containers for abrasive liquid, pipes extending from said containers and terminating at locations in proximity to said tools for conveying the abrasive liquid from said containers to each of said tools, atomizing nozzles on the terminating ends of said pipes and directed toward the lower face of a glass sheet being finished, and fluid pressure means for projecting the abrasive liquid by atomisation through said nozzles onto the lower face of the glass sheet.

3. Apparatus for finishing at least the lower face of a glass sheet, comprising a plurality of revolving tools adapted to work on the lower face of a glass sheet, a beam carrying said tools in operative position, containers for abrasive liquid, pipes extending from said containers and terminating at locations in proximity to said tools for conveying the abrasive liquid from said containers to each of said tools, atomizing nozzles on the terminating ends of said pipes and directed toward the lower face of a glass sheet being finished, an air pressure supply duct, connecting pipes between said supply duct and each of said nozzles, and valves in said connecting pipes to control the flow of pressurized air through the latter for projecting the abrasive liquid by atomisation through the related nozzles onto the lower face of said glass sheet.

4. Apparatus according to claim 2; further comprising means periodically controlling the operation of said fluid pressure means.

5. Apparatus according to claim 3, wherein said beam is mounted for reciprocating movement, said valves being periodically actuated in response to said reciprocating movement.

6. A process for feeding abrasive fluid to at least the glass polishing tools working on the lower surface of a continuous glass sheet which is undergoing simultaneous finishing of its upper and lower surfaces; said process comprising the steps of conveying the abrasive fluid to spraying locations in the proximity of the glass polishing tools working on the lower surface of the glass sheet, atomizing the abrasive fluid at the spraying locations and directing the atomized abrasive fluid against the areas of the lower surface of the glass sheet being polished so that the atomized abrasive fluid adheres to the lower surface and is uniformly distributed and so that the proportions of the abrasive fluid applied to the lower surface are exactly adjustable.

7. A process according to claim 6; including applying pressure to the abrasive fluid to cause the latter to flow to said spraying locations and to be atomized at said locations, and periodically lowering the pressure applied to the abrasive fluid so that atomization of the latter is then halted while maintaining a reduced flow of abrasive fluid for preventing clogging of the abrasive at the spraying locations.

8. A process according to claim 6; including periodically applying pressure to the abrasive fluid to cause intermittent atomization of the latter, conveying water to spraying locations in the proximity of the glass polishing tools working on the lower surface of the glass sheet, periodically applying pressure to the water to cause intermittent atomization of the water directed against the areas of the lower surface of the glass sheet worked upon by the glass polishing tools, and alternating the periodic application of pressure to the abrasive fluid and water so that atomized abrasive fluid and water are successively and alternately directed against and adhered to the lower surface of the glass sheet.

9. Apparatus for feeding abrasive fluid to a glass surfacing tool working at least on the lower face of a glass sheet; comprising a container for abrasive fluid, first and second nozzles in proximity to and directed towards the area of the lower face of a glass sheet being surfaced, said first and second nozzles respectively opening at the center and adjacent the periphery of the related glass surfacing tool, pipes leading from said container to said first and second nozzles, and fluid pressure means for impelling the adbrasive fluid through said pipes and nozzles and projecting the abrasive fluid by atomization onto the lower face of the glass sheet.

10. The process for feeding abrasive fluid to glass surfacing tools working at least on the lower face of a glass sheet, comprising applying a driving force to the abrasive fluid, subjecting said abrasive fluid to atomisation and simultaneously projecting the abrasive fluid onto the lower face of the glass sheet centrally and adjacent the periphery of each tool.

EDMOND LAVERDISSE.

References Cited in the file of this patent

UNITED STATES PATENTS

| Number | Name | Date |
|---|---|---|
| 1,409,888 | Taylor | Mar. 14, 1922 |
| 1,618,085 | Hess | Feb. 15, 1927 |
| 1,800,743 | Morris | Apr. 14, 1931 |
| 2,041,642 | Griffin | May 19, 1936 |
| 2,178,504 | Waldron et al. | Oct. 31, 1939 |
| 2,309,819 | Benner | Feb. 2, 1943 |